US012691684B2

(12) United States Patent
Hatta et al.

(10) Patent No.: US 12,691,684 B2
(45) Date of Patent: Jul. 28, 2026

(54) LIQUID DISCHARGE HEAD, LIQUID DISCHARGE UNIT, AND LIQUID DISCHARGE APPARATUS

(71) Applicants: Chikako Hatta, Kanagawa (JP); Kohta Akiyama, Kanagawa (JP)

(72) Inventors: Chikako Hatta, Kanagawa (JP); Kohta Akiyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 61 days.

(21) Appl. No.: 18/621,150

(22) Filed: Mar. 29, 2024

(65) Prior Publication Data

US 2024/0326429 A1 Oct. 3, 2024

(30) Foreign Application Priority Data

Mar. 30, 2023 (JP) ................................ 2023-055305

(51) Int. Cl.

| | |
|---|---|
| ***B41J 2/14*** | (2006.01) |
| ***B41J 2/165*** | (2006.01) |
| ***B41J 2/175*** | (2006.01) |
| ***B41J 11/00*** | (2006.01) |

(52) U.S. Cl.

CPC ........... *B41J 2/14274* (2013.01); *B41J 2/165* (2013.01); *B41J 2/175* (2013.01); *B41J 11/007* (2013.01); *B41J 2002/14306* (2013.01)

(58) Field of Classification Search

CPC .................................................... B41J 2/14274

See application file for complete search history.

(56) References Cited

U.S. PATENT DOCUMENTS

| | | | | |
|---|---|---|---|---|
| 11,325,381 | B2 * | 5/2022 | Hirota | B41J 2/162 |
| 2002/0191055 | A1 | 12/2002 | Shingai et al. | |
| 2007/0046737 | A1 | 3/2007 | Sugahara | |

(Continued)

FOREIGN PATENT DOCUMENTS

| | | | |
|---|---|---|---|
| CN | 102328507 | A | 1/2012 |
| CN | 114454620 | A | 5/2022 |

(Continued)

OTHER PUBLICATIONS

Extended European Search Report issued Aug. 14, 2024 in European Patent Application No. 24166157.8, 7 pages.

(Continued)

*Primary Examiner* — Sharon Polk
(74) *Attorney, Agent, or Firm* — XSENSUS LLP

(57) ABSTRACT

A liquid discharge head includes a nozzle plate and a channel substrate. The nozzle plate has a nozzle from which a liquid is dischargeable in a first direction. The channel substrate is laminated over the nozzle plate. The channel substrate has a pressure chamber, an individual supply chamber having a first height h1, and a fluid restrictor. The liquid flows from the individual supply chamber to the pressure chamber through the fluid restrictor in a second direction. The fluid restrictor has a width narrower than each of a width of the pressure chamber and a width of the individual supply chamber in a third direction, and a second height h2 smaller than the first height h1 in the first direction. The first height h1 of the individual supply chamber and the second height h2 of the fluid restrictor satisfy $0.3 \leq h2/h1 \leq 0.6$.

20 Claims, 9 Drawing Sheets

(56) References Cited

U.S. PATENT DOCUMENTS

| | | | |
|---|---|---|---|
| 2016/0144620 | A1 | 5/2016 | Masuda et al. |
| 2017/0157924 | A1 | 6/2017 | Otome et al. |
| 2017/0326874 | A1 | 11/2017 | Akiyama |
| 2018/0001635 | A1 | 1/2018 | Tomimatsu et al. |
| 2019/0217607 | A1 | 7/2019 | Akiyama et al. |
| 2020/0171817 | A1* | 6/2020 | Hada ...................... B41J 2/2054 |
| 2020/0171828 | A1 | 6/2020 | Matsufuji et al. |
| 2020/0290352 | A1* | 9/2020 | Akiyama ............... B41J 2/1433 |
| 2020/0307246 | A1 | 10/2020 | Hatta et al. |
| 2021/0009824 | A1 | 1/2021 | Miyakoshi et al. |
| 2021/0162758 | A1 | 6/2021 | Fukuzawa et al. |
| 2022/0032614 | A1 | 2/2022 | Akiyama |
| 2022/0143975 | A1 | 5/2022 | Akiyama |
| 2022/0371336 | A1 | 11/2022 | Mizutani et al. |
| 2023/0241890 | A1 | 8/2023 | Masaya et al. |
| 2023/0398780 | A1 | 12/2023 | Hatta et al. |

FOREIGN PATENT DOCUMENTS

| | | | |
|---|---|---|---|
| EP | 3 587 116 | A1 | 1/2020 |
| JP | 2004-195719 | A | 7/2004 |
| JP | 2017-209821 | A | 11/2017 |
| JP | 2018-154067 | A | 10/2018 |
| WO | 2019/176211 | A1 | 9/2019 |

OTHER PUBLICATIONS

Office Action issued Apr. 27, 2026 in Chinese Patent Application No. 202410369244.0, 8 pages.

* cited by examiner

LIQUID DISCHARGE HEAD, LIQUID DISCHARGE UNIT, AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2023-055305, filed on Mar. 30, 2023, in the Japan Patent Office, the entire disclosure of which is hereby incorporated by reference herein.

BACKGROUND

Technical Field

Embodiments of the present disclosure relate to a liquid discharge head, a liquid discharge unit, and a liquid discharge apparatus.

Related Art

An inkjet image forming apparatus includes a liquid discharge head that discharges a liquid from a nozzle to form an image. In such a liquid discharge head, the liquid is supplied from a common chamber to an individual chamber communicating with the nozzle. The liquid in the individual chamber is discharged when pressure is applied.

SUMMARY

Embodiments of the present disclosure describe an improved liquid discharge head that includes a nozzle plate and a channel substrate. The nozzle plate has a nozzle from which a liquid is dischargeable in a first direction. The channel substrate is laminated over the nozzle plate in the first direction. The channel substrate has a pressure chamber communicating with the nozzle, an individual supply chamber having a first height h1 in the first direction, and a fluid restrictor between the pressure chamber and the individual supply chamber. The liquid flows from the individual supply chamber to the pressure chamber through the fluid restrictor in a second direction orthogonal to the first direction. The fluid restrictor has a width narrower than each of a width of the pressure chamber and a width of the individual supply chamber in a third direction orthogonal to the first direction and the second direction, and a second height h2 smaller than the first height h1 in the first direction. The first height h1 of the individual supply chamber and the second height h2 of the fluid restrictor satisfy $0.3 \leq h2/h1 \leq 0.6$.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
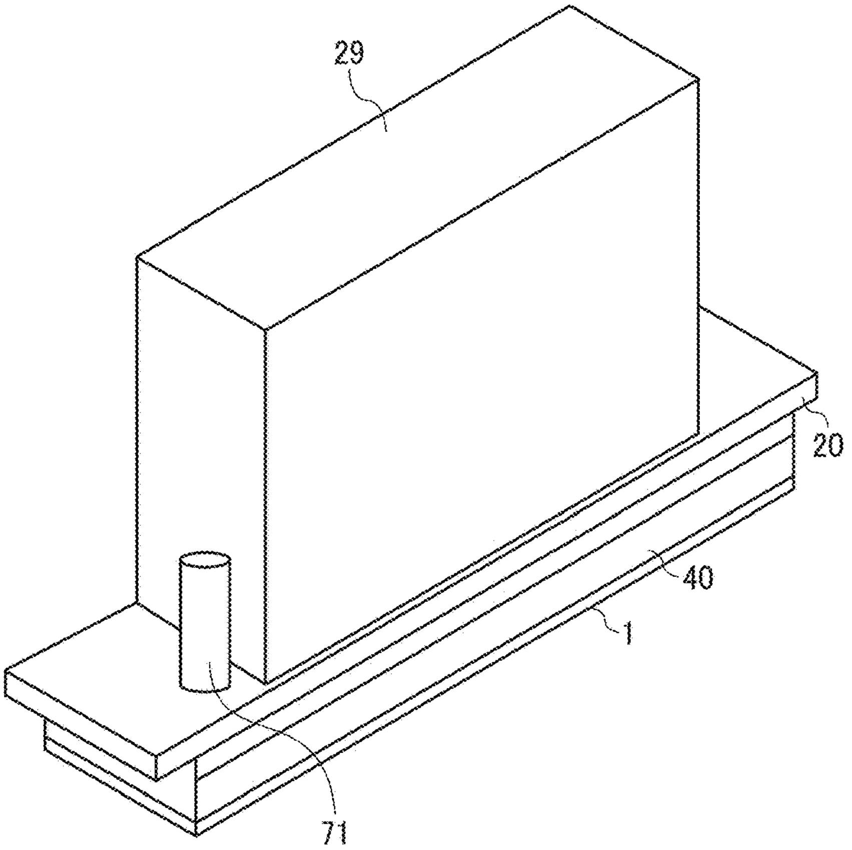
FIG. 1 is a schematic external perspective view of a liquid discharge head according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A liquid discharge head, a liquid discharge unit, and a liquid discharge apparatus according to embodiments of the present disclosure are described below with reference to the drawings. Embodiments of the present disclosure are not limited to the embodiments described below and may be other embodiments than the embodiments described below. The following embodiments may be modified by, for example, addition, modification, or omission within the scope that would be obvious to one skilled in the art. Any aspects having advantages as described for the following embodiments according to the present disclosure are included within the scope of the present disclosure.

A liquid discharge head according to an embodiment of the present disclosure includes a nozzle plate having a nozzle to discharge a liquid and a channel substrate having a pressure chamber, a fluid restrictor, and an individual supply chamber. The channel substrate is laminated over the nozzle plate. The pressure chamber communicates with the nozzle. The individual supply chamber communicates with the pressure chamber via the fluid restrictor. The fluid restrictor is a portion of a channel of liquid formed between the pressure chamber and the individual supply chamber. The portion of the channel is narrow in an in-plane direction of the channel substrate. A lamination direction of the nozzle plate and the channel substrate is a height direction, and a height h1 of the individual supply chamber and a height h2 of the fluid restrictor satisfies $0.3 \leq h2/h1 \leq 0.6$.

According to one aspect of the present disclosure, a natural vibration period Tc can be shortened, and a printing speed can be increased. In a comparative technique, the vicinity of a hole of a nozzle may be narrowed to shorten the natural vibration period Tc. In this case, the dry resistance of the nozzle may be impaired. By contrast, in an embodiment of the present disclosure, the natural vibration period Tc can be shortened without narrowing the vicinity of the hole of the nozzle, so that the natural vibration period Tc can be shortened while maintaining the dry resistance of the nozzle, and nozzle missing can be prevented.

FIG. 1 is an external perspective view of a liquid discharge head according to an embodiment of the present disclosure.

The liquid discharge head according to the present embodiment includes, for example, a nozzle plate 1, an individual channel substrate 40, and a common chamber substrate 20, and further includes a cover 29 for the purpose of protection. The nozzle plate 1 is disposed at the bottom of the liquid discharge head. The individual channel substrate 40 is laminated over the nozzle plate 1, and the common chamber substrate 20 is laminated over the individual channel substrate. The nozzle plate 1 has a nozzle from which a liquid is discharged. The nozzle may be referred to as, for example, a nozzle hole. The discharged liquid may be referred to as, for example, a droplet of liquid.

The liquid to be discharged from the nozzle is supplied from a supply port 71. The liquid supplied from the supply port 71 flows through the common chamber substrate 20 and the individual channel substrate 40 in this order, and is discharged from the nozzle.

Figure 2A:
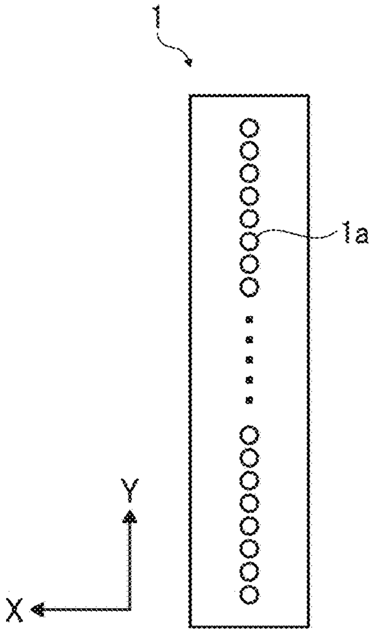
FIGS. 2A and 2B are schematic plan views of a nozzle plate according to an embodiment of the present disclosure.
Figure 2B:
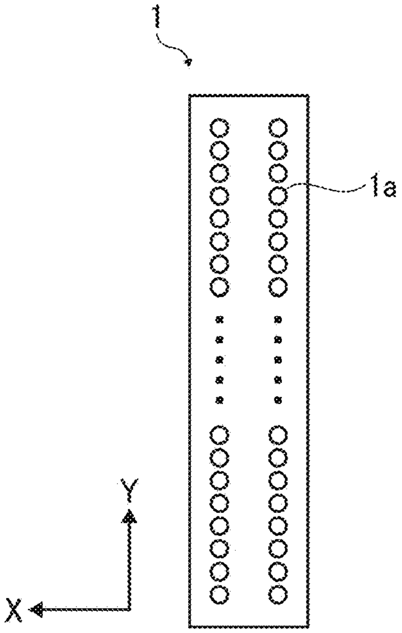

FIGS. 2A and 2B are schematic plan views of the nozzle plate 1 when the liquid discharge head of FIG. 1 is viewed from below.

The nozzle plate 1 has a nozzle 1*a*. For example, as illustrated in FIG. 2A, the nozzle plate 1 may have multiple nozzles 1*a* arrayed in a row. As illustrated in FIG. 2B, the nozzle plate 1 may have multiple nozzles 1*a* arrayed in two rows, or may have multiple nozzles arrayed in multiple rows. The multiple nozzles may be arrayed in staggered manner in the multiple rows. In FIGS. 2A and 2B, the nozzle array direction of the multiple nozzles 1*a* is the Y direction.

Figure 3:
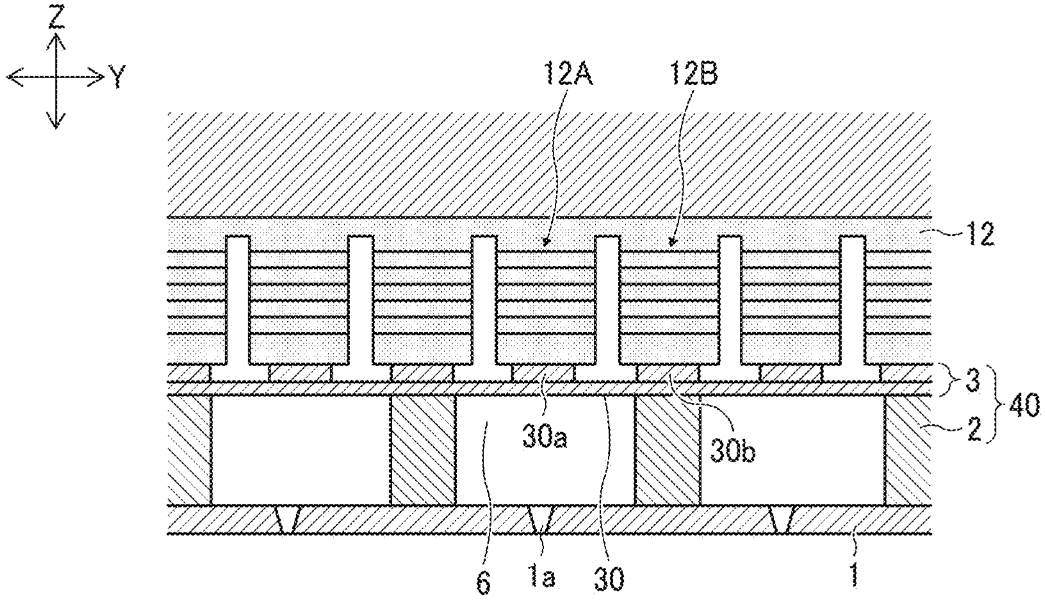
FIG. 3 is a schematic cross-sectional view of a liquid discharge head according to an embodiment of the present disclosure.

FIG. 3 is a schematic cross-sectional view of a part of the liquid discharge head of FIG. 1 in the direction parallel to the nozzle array direction. FIG. 3 illustrates the cross section of the liquid discharge head in the Y direction.

As illustrated in FIG. 3, the individual channel substrate 40 is laminated over the nozzle plate 1. In the present embodiment, the nozzle plate 1 and the individual channel substrate 40 are joined to each other. The individual channel substrate 40 includes, for example, a channel substrate 2 and a diaphragm 3. The channel substrate 2 includes a pressure chamber 6 communicating with the nozzle 1*a*. The pressure chamber 6 may be referred to as, for example, a pressurization chamber.

The pressure chamber 6 communicating with the nozzle 1*a* is disposed above the nozzle 1*a* in FIG. 3. The pressure chamber 6 is disposed for each nozzle 1*a*. A piezoelectric actuator 12 is disposed above the pressure chamber 6. When a voltage is applied to the piezoelectric actuator 12, an upper face 30 of the pressure chamber 6 is deformed to apply pressure to the pressure chamber 6. When the pressure is applied to the pressure chamber 6, the pressure is applied to the liquid in the pressure chamber 6, and the droplet of the liquid is discharged from the nozzle 1*a*. In other words, the piezoelectric actuator 12 is driven to discharge the droplet of the liquid from the nozzle 1*a*.

The diaphragm 3 is laminated over opposite side of the channel substrate 2 with respect to the nozzle plate 1. The upper face 30 is a part of the diaphragm 3. A projection 30*a* and a projection 30*b* are parts of the diaphragm 3. The projection 30*a* is disposed above the pressure chamber 6, and the projection 30*b* is disposed above a partition wall. The projection 30*a* may be referred to as, for example, a support. A portion 12A of the piezoelectric actuator 12 is disposed above the pressure chamber 6, and a portion 12B of the piezoelectric actuator 12 is disposed above the partition wall.

Figure 4:
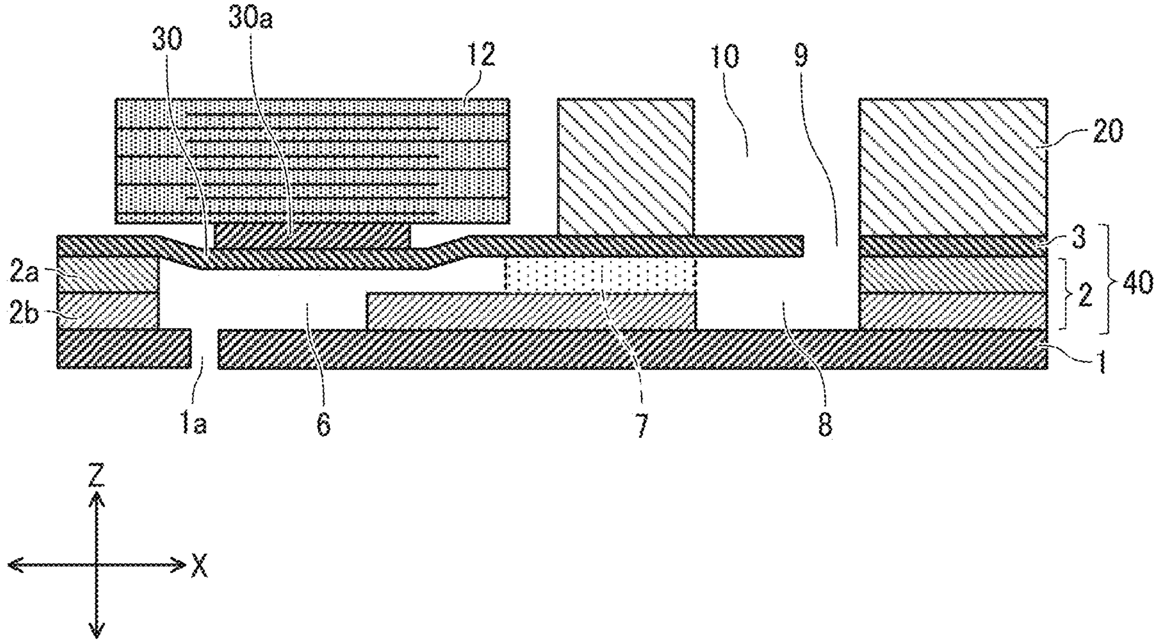
FIG. 4 is a schematic cross-sectional view of a liquid discharge head according to an embodiment of the present disclosure.

FIG. 4 is a schematic cross-sectional view of a part of the liquid discharge head of FIG. 1 in the direction orthogonal to the nozzle array direction.

In the present embodiment, the nozzle plate 1, the channel substrate 2, the diaphragm 3, and the common chamber substrate 20 are laminated one over another. The lamination direction (i.e., a first direction) is the Z direction. The pressure chamber 6, a fluid restrictor 7, and an individual supply chamber 8 are formed in the channel substrate 2. The pressure chamber 6 communicates with the nozzle 1*a*, and the individual supply chamber 8 communicates with the pressure chamber 6 through the fluid restrictor 7. The liquid flows through the common chamber 10, a liquid introduction port 9, which is an opening of the diaphragm 3, the individual supply chamber 8, the fluid restrictor 7, and the pressure chamber 6 in this order. The individual supply chamber 8 may be referred to as, for example, an individual ink supply chamber.

In the present embodiment, the width of the fluid restrictor 7 in the depth direction (i.e., a third direction) in FIG. 4 is smaller than the width of the pressure chamber 6 in the same depth direction (refer to a plan view in FIG. 7C to be described later). The fluid restrictor 7 in the present embodiment is a portion of a channel of liquid formed between the pressure chamber 6 and the individual supply chamber 8, and the channel has a narrow width in an in-plane direction of the channel substrate 2. The width of the channel in the in-plane direction of the channel substrate 2 used herein is a length of the channel in the direction orthogonal to the direction from the individual supply chamber 8 toward the pressure chamber 6.

In the present embodiment, the liquid in the common chamber 10 flows to the individual supply chamber 8, passes through the fluid restrictor 7 having the narrowed channel, and flows to the pressure chamber 6. As described above, since the channel of liquid is narrowed in the fluid restrictor 7, the compliance can be decreased and the natural vibration period Tc can be shortened.

Figure 5A:
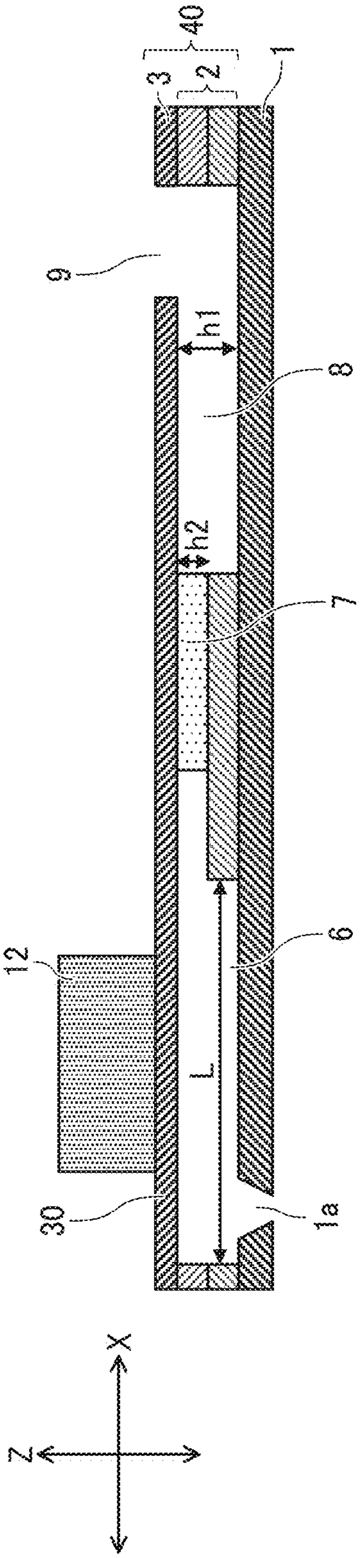
FIG. 5A is a schematic cross-sectional view of a liquid discharge head according to an embodiment of the present disclosure.
Figure 5B:
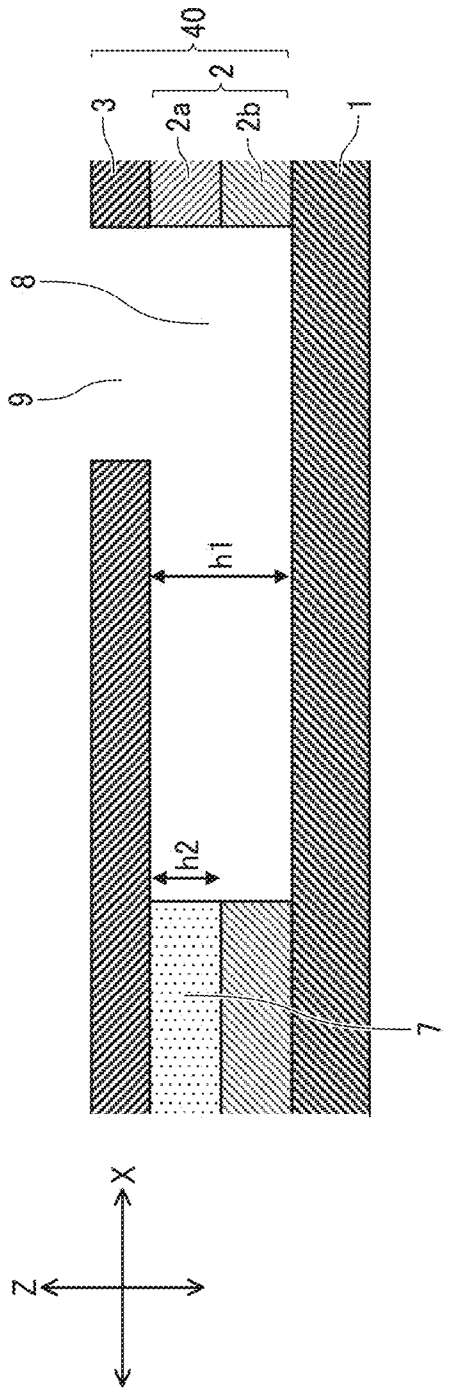
FIG. 5B is an enlarged cross-sectional view of the liquid discharge head of FIG. 5A.

FIGS. 5A and 5B are schematic cross-sectional views of a part of a liquid discharge head according to an embodiment of the present disclosure (Embodiment 1). FIG. 5A is a cross-sectional view of apart of a liquid discharge head, similar to FIG. 4. FIG. 5B is a partially enlarged view of FIG. 5A.

The lamination direction of the nozzle plate 1 and the channel substrate 2 may be referred to as a height direction, i.e., the lamination direction and the height direction are the Z direction. In the present embodiment, a height h1 of the individual supply chamber 8 and a height h2 of the fluid restrictor 7 satisfy $0.3 \leq h2/h1 \leq 0.6$. When the height ratio h2/h1 is 0.3 or more and 0.6 or less, the liquid can flow through the fluid restrictor 7 with a sufficiently small inertance. Accordingly, the natural vibration period Tc can be shortened. As a result, the printing speed can be increased, and the productivity can be enhanced.

The fluid restrictor 7 is the portion of the channel of liquid formed between the pressure chamber 6 and the individual supply chamber 8, and the portion of the channel has a narrow width in an in-plane direction of the channel substrate 2. The height h2 of the fluid restrictor 7 is the height of the portion of the channel having the narrow width. The width of the channel used herein is the length in the direction orthogonal to the direction from the individual supply chamber 8 toward the pressure chamber 6 (i.e., the length in the Y direction).

When the height ratio h2/h1 is less than 0.3, the height h2 of the fluid restrictor 7 is small with respect to the height h1 of the individual supply chamber 8, and the effect of the fluid restrictor 7 becomes excessive. As a result, the liquid does not smoothly flow through the fluid restrictor 7, and the liquid supply to the pressure chamber 6 is insufficient.

When the height ratio h2/h1 is larger than 0.6, the height h1 of the individual supply chamber 8 is small with respect to the height h2 of the fluid restrictor 7, and the inertance is not sufficiently small. Even when the fluid restrictor 7 is provided, an effect of shortening the natural vibration period Tc is not obtained, and the natural vibration period Tc is not shortened. As a result, the printing speed is not increased, and the productivity is not enhanced.

The inertance and the natural vibration period Tc are described below.

The natural vibration period Tc is defined by $Tc=2\pi(MC)^{11}$, where M represents the inertance, and C represents the compliance. According to the findings so far, it has been considered that the natural vibration period Tc in the liquid discharge head is affected by the inertance M and compliance C on a side closer to the nozzle than the fluid restrictor (for example, the inertance and compliance of the pressure chamber). Thus, a configuration of the portion close to the nozzle has typically been studied.

As a result of intensive studies by the inventors, it has been found that the natural vibration period Tc in the liquid discharge head is also affected by the individual supply chamber 8 on an upstream side of the fluid restrictor 7. It has been found that an effect of increasing a natural vibration frequency can be obtained by reducing a component of the inertance M in the individual supply chamber 8. Accordingly, the configuration of the individual supply chamber 8 appropriately considered can shorten the natural vibration period Tc, leading to the present disclosure.

When the channel is approximated to be cylindrical, the inertance M is expressed by the formula $M=k\times\rho\times l/(\pi\times r^2)$, where k represents a correction factor, ρ represents the density of the liquid, l represents the length of the channel, and r represents a radius of the channel. The denominator indicates a cross-sectional area of the channel.

In consideration of such a formula, the height h1 of the individual supply chamber 8 is increased, and the inertance M is decreased. By contrast, if the height h1 of the individual supply chamber 8 is too large, the effect of the fluid restrictor 7 becomes excessive. For this reason, as described above, the height ratio of the height h2 of the fluid restrictor 7 to the height h1 of the individual supply chamber 8 is restricted.

A printing waveform is designed using meniscus vibration with the natural vibration period Tc. Thus, when the natural vibration period Tc is shortened, a waveform length in the printing waveform can be shortened, and a drive frequency can be increased. As a result, the printing speed can be increased by shortening the natural vibration period Tc.

Figure 6A:
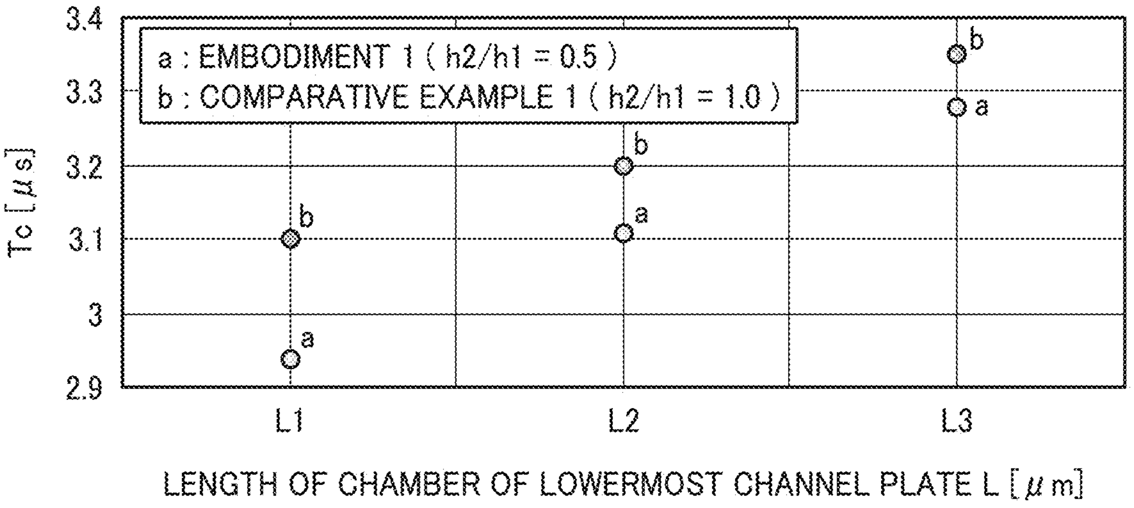
FIG. 6A is a graph of a natural vibration period Tc when a height ratio h2/h1 is changed according to Embodiment 1 of the present disclosure and Comparative Example 1.

FIG. 6A is a graph of the natural vibration period Tc when the height ratio h2/h1 is changed.

In FIG. 6A, points a indicate plots of Embodiment 1, and points b indicate plots of Comparative Example 1. In Embodiment 1, the liquid discharge head has a configuration illustrated in FIGS. 5A and 5B, and the height ratio h2/h1=0.5. In Comparative Example 1, the liquid discharge head has a configuration illustrated in FIGS. 5A and 5B, and the height ratio h2/h1=1.0. In FIG. 6A, the horizontal axis indicates a length L of the pressure chamber 6 in a lowermost channel plate as illustrated in FIG. 5A. The natural vibration period Tc was obtained with various lengths L in each of Embodiment 1 and Comparative Example 1. In FIG. 6A, the various lengths L includes lengths L1, L2, and L3 satisfying $L1<L2<L3$.

In Embodiment 1, the height ratio h2/h1=0.5, which is within the scope of an embodiment of the present disclosure. In Comparative Example 1, the height ratio h2/h1=1.0, which exceeds an upper limit of an embodiment of the present disclosure. As illustrated in FIG. 6A, the natural vibration period Tc indicated by the point a in Embodiment 1 is shorter than the natural vibration period Tc indicated by the point b in Comparative Example 1 in each of the lengths L1 to L3. In Comparative Example 1, the height ratio h2/h1 is larger than the upper limit of 0.6. As a result, the inertance is not sufficiently small, and the natural vibration period Tc is not sufficiently shortened.

Figure 6B:
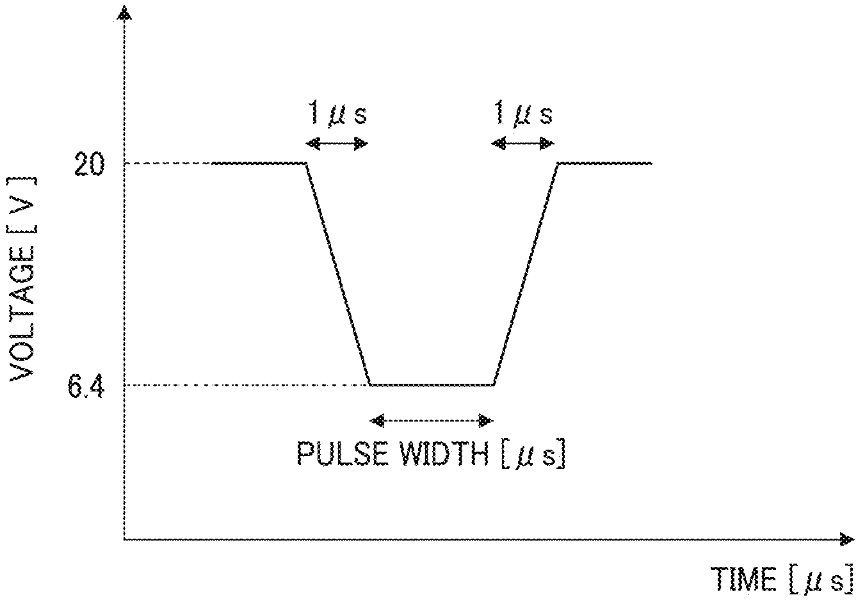
FIG. 6B is a diagram of a waveform illustrating the natural vibration period Tc in FIG. 6A.

In Embodiment 1 and Comparative Example 1, the natural vibration period Tc was obtained as follows. A voltage is adjusted so that a speed of liquid droplet is 8.7 m/s when a pulse width of the waveform illustrated in FIG. 6B is 0.8 s. The speed of liquid droplet is measured while the pulse width is gradually increased. The measured speed of liquid droplet is periodically changed.

A difference between the pulse width when the speed of liquid droplet reaches the first peak and the pulse width when the speed of liquid droplet reaches the second peak is the natural vibration period Tc.

As the height ratio h2/h1 is decreased, the natural vibration period Tc is shortened, but discharge failure occurs at a certain point of time. As described above, when the height ratio h2/h1 is less than 0.3, the effect of the fluid restrictor 7 is excessive, and the liquid supply to the pressure chamber 6 becomes insufficient, resulting in the discharge failure. When the height ratio h2/h1 is 0.3, discharging performance is slightly inferior to that when the height ratio h2/h1 is 0.5, but is an acceptable level. As a result, the natural vibration period Tc can be further shortened.

The height h1 of the individual supply chamber 8 is preferably 50 m or more and 200 μm or less. Within this range, the inertance can be decreased and the natural vibration period Tc can be shortened to obtain the effect of the fluid resistance of the fluid restrictor 7.

A volume of the individual supply chamber 8 is preferably 6 nano-litters (nL) or more and 20 nL or less. Within this range, the inertance can be decreased and the natural vibration period Tc can be shortened to obtain the effect of the fluid resistance of the fluid restrictor 7.

As illustrated in FIGS. 4, 5A, and 5B, the channel substrate 2 preferably includes multiple channel plates laminated one over another. In this case, the multiple channel plates facilitate the formation of the fluid restrictor 7. As illustrated in FIG. 4 and FIGS. 5A and 5B, a first channel plate 2*a* and a second channel plate 2*b* are laminated to form the channel substrate 2 in the present embodiment. The multiple channel plates are referred to as, for example, a first channel plate, a second channel plate, and so on.

The liquid discharge head according to the present embodiment is a non-circulation type liquid discharge head that does not circulate liquid. In an embodiment of the present disclosure, the non-circulation type liquid discharge head is preferable. The non-circulation type is a system in which the liquid is not circulated. In such a system, for example, the liquid supplied to the pressure chamber 6 does not return to the common chamber 10.

In the comparative technique, the vicinity of the hole of the nozzle may be narrowed to shorten the natural vibration period Tc. In this case, the dry resistance of the nozzle may deteriorate. In the present embodiment, the natural vibration period Tc can be shortened without narrowing the vicinity of the hole of the nozzle, so that the natural vibration period Tc can be shortened by a method that does not impair the dry resistance of the nozzle. In a case of the circulation type, the dry resistance of the nozzle can be enhanced, but in the present embodiment, the dry resistance of the nozzle can be maintained without the circulation of liquid. The non-circulation type as in the present embodiment can downsize the apparatus and prevent an increase in manufacturing cost.

A liquid discharge head according to another embodiment of the present embodiment (Embodiment 2) is described below.

Figure 7A:
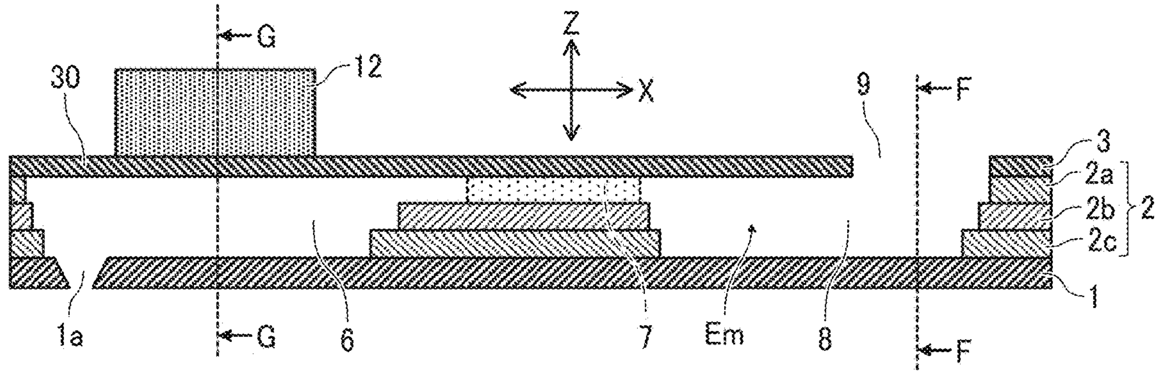
FIGS. 7A, 7B, and 7D are schematic cross-sectional views of a liquid discharge head according to Embodiment 2 of the present disclosure.
Figure 7B:
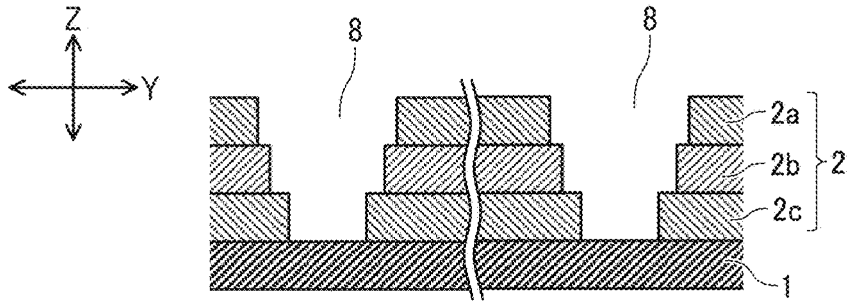
Figure 7C:
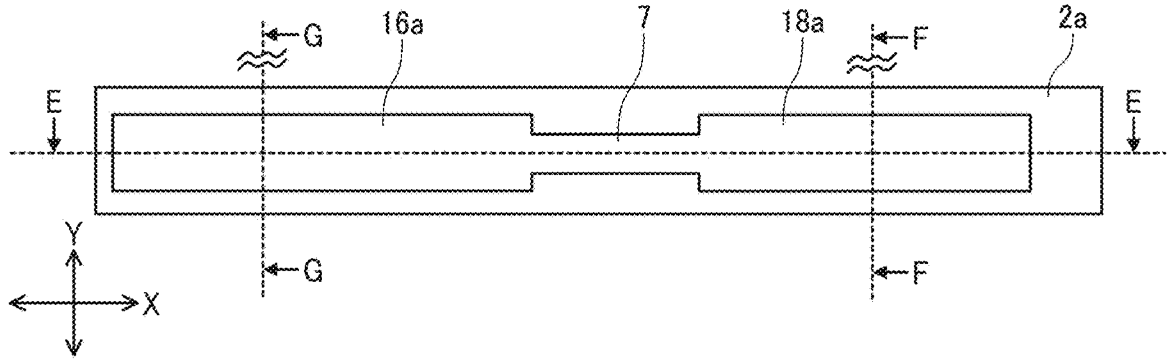
FIG. 7C is a schematic plan view of the liquid discharge head of FIGS. 7A, 7B, and 7D.

FIGS. 7A to 7D are diagrams each illustrating the liquid discharge head according to Embodiment 2. FIG. 7A is a schematic cross-sectional view of the liquid discharge head, similar to FIG. 5A. FIG. 7B is a schematic cross-sectional view of the liquid discharge head of FIG. 7A taken along line F-F in FIG. 7A, i.e., a cross-sectional view in the nozzle array direction (Y direction). In FIG. 7B, only two adjacent individual supply chambers 8 are illustrated. FIG. 7C is a schematic plan view of the first channel plate 2*a* in the channel substrate 2 of FIG. 7A. A cross section taken along line E-E in FIG. 7C corresponds to FIG. 7A, and a cross section taken along line F-F in FIG. 7C corresponds to FIG. 7B.

In FIG. 7A, the fluid restrictor 7 is indicated by broken lines for the sake of description. In consideration of FIG. 7C, the portion of the fluid restrictor 7 in FIG. 7A is the channel of liquid, i.e., a void space in which no component is present. However, the fluid restrictor 7 is illustrated for the sake of description. Such an illustration also applies to, for example, FIG. 4 for a similar reason.

Figure 8:
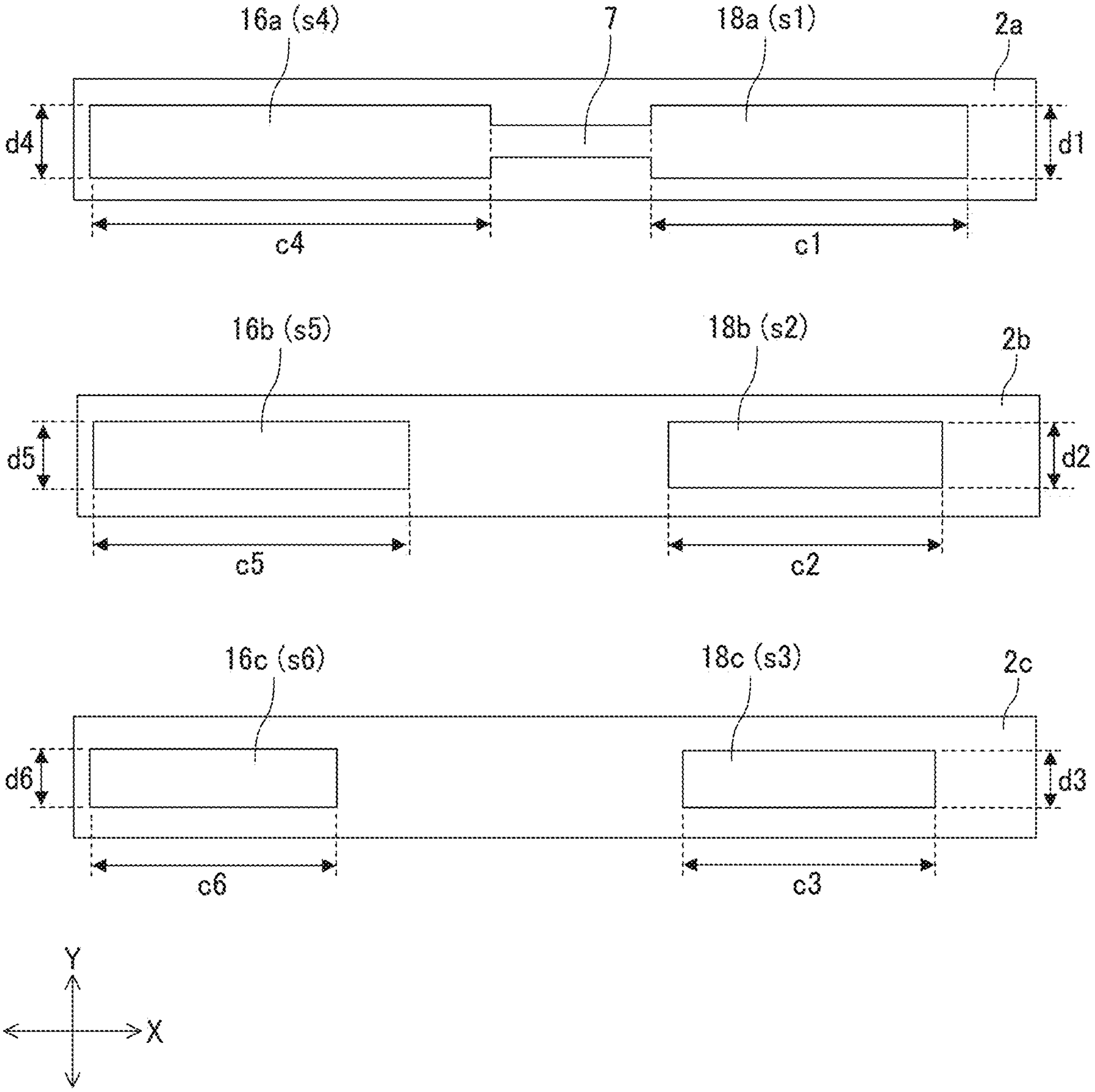
FIG. 8 is an exploded schematic plan view of channel plates of the liquid discharge head of FIGS. 7A to 7D.

FIG. 8 is a schematic plan view of each component forming the channel substrate 2, i.e., an exploded schematic plan view of the channel substrate 2. In Embodiment 2, the first channel plate 2*a*, the second channel plate 2*b*, and a third channel plate 2*c* are laminated to form the channel substrate 2. Each of the first channel plate 2*a*, the second channel plate 2*b*, and the third channel plate 2*c* has one or more openings, and these openings form the pressure chamber 6 and the individual supply chamber 8.

The first channel plate 2*a* has one continuous opening including an opening 16*a* to define the pressure chamber 6 and an opening 18*a* to define the individual supply chamber 8. The opening of the first channel plate 2*a* further includes an opening to define the fluid restrictor 7. In other words, the first channel plate 2*a* seems to have two openings (i.e., the opening 16*a* and opening 18*a*) and the fluid restrictor 7 defining a channel connecting the opening 16*a* and the opening 18*a* Each of the second channel plate 2*b* and the third channel plate 2*c* includes two openings. The second channel plate 2*b* has openings 16*b* and 18*b*, and the third channel plate 2*c* has openings 16*c* and 18*c*. When the first channel plate 2*a*, the second channel plate 2*b*, and the third channel plate 2*c* are laminated to form the channel substrate 2, for example, as illustrated in FIG. 7B, the individual supply chamber 8 is formed of the openings 18*a*, 18*b*, and 18*c* (i.e., second openings). In the present embodiment, an upper face of the individual supply chamber 8 is formed by the diaphragm 3, and a lower face of the individual supply chamber 8 is formed by the nozzle plate 1.

When the first channel plate 2*a*, the second channel plate 2*b*, and the third channel plate 2*c* are laminated to form the channel substrate 2, the openings 16*a*, 16*b*, and 16*c* (i.e., first openings) form the pressure chamber 6. In the present embodiment, the upper face 30 of the pressure chamber 6 is formed by the diaphragm 3, and a lower face of the pressure chamber 6 is formed by the nozzle plate 1.

The configuration in the present embodiment is described again. In the present embodiment, the channel substrate 2 includes multiple channel plates laminated one on another, and each of the multiple channel plates has one or more openings. When the multiple channel plates are laminated, the pressure chamber 6 and the individual supply chamber 8 are formed by the openings, and the fluid restrictor 7 is formed in one of the multiple channel plates. Such a configuration facilitates the formation of the channel substrate 2.

This configuration is also applied to the embodiment illustrated in FIG. 4 and FIGS. 5A and 5B. In the embodiment illustrated in FIG. 4 and FIGS. 5A and 5B, the channel substrate 2 includes the first channel plate 2*a* and the second channel plate 2*b*.

For example, the size of the opening of the first channel plate 2*a* is appropriately selected. In the present embodiment, the size of the opening forming the individual supply chamber 8 is preferably smaller as the channel plate is closer to the nozzle plate 1 when the multiple channel plates are compared with one another. Due to such a configuration, when a bubble is mixed in the liquid, the bubble can be smoothly purged. The present embodiment corresponds to this configuration.

As illustrated in FIGS. 7A, 7B, and 8, the size of the openings 18*a*, 18*b*, and 18*c* forming the individual supply chamber 8 is smaller as the channel plate is closer to the nozzle plate 1 when the first channel plate 2*a*, the second channel plate 2*b*, and the third channel plate 2*c* are compared with one another. In other words, the size of the opening 18*a*, the opening 18*b*, and the opening 18*c* decreases in this order. The size of the opening used herein refers to an area of the opening in plan view. As illustrated in FIG. 8, the opening 18*a*, the opening 18*b*, and the opening 18*c* have an area s1, an area s2, and an area s3, respectively. The areas s1, s2, and s3 satisfy $s1>s2>s3$. The area s1 is the area of the opening 18*a* up to a broken line indicating the boundary between the opening 18*a* and the opening of the fluid restrictor 7.

Furthermore, in the present embodiment, the opening forming the individual supply chamber 8 has a longitudinal side and a transverse side in the in-plane direction (i.e., a second direction and the third direction) of the channel substrate 2, and the longitudinal side and the transverse side of the opening are preferably shorter as the channel plate is closer to the nozzle plate 1 when the multiple channel plates are compared with one another. Due to such a configuration, when a bubble is mixed in the liquid, the bubble can be more smoothly purged.

The present embodiment corresponds to this configuration.

As illustrated in FIG. 8, each of the opening 18*a*, the opening 18*b*, and the opening 18*c* forming the individual supply chamber 8 has the longitudinal side and the transverse side in the in-plane direction of the channel substrate 2. The direction of the longitudinal side is the X direction, and the direction of the transverse side is the Y direction. In the first channel plate 2*a*, the opening 18*a* is connected to the opening of the fluid restrictor 7, and the opening 18*a* having such a shape also has the longitudinal side and the transverse side.

As illustrated in FIG. 8, the longitudinal sides of the opening 18*a*, the opening 18*b*, and the opening 18*c* have a length c1, a length c2, and a length c3, respectively, and the transverse sides of the opening 18*a*, the opening 18*b*, and the opening 18*c* have a length d1, a length d2, and a length d3, respectively. The lengths c1, c2, and c3 satisfy c1>c2>c3, and the lengths d1, d2, and d3 satisfy d1>d2>d3.

Furthermore, in the present embodiment, a wall face of the individual supply chamber 8 preferably has a stepped shape. As illustrated in FIGS. 7A and 7B, the stepped shape is preferably a shape in which a distance between opposing wall faces becomes shorter as the channel plate is closer to the nozzle plate 1. In this case, when a bubble is mixed in the liquid, the bubble can be reliably purged. The present embodiment corresponds to this configuration.

When the individual supply chamber 8 is defined by the configuration in which the openings in the multiple channel plates become smaller as the channel plate is closer to the nozzle plate 1, the individual supply chamber 8 may have the configuration in which positions of the openings are shifted from one another. The definition by the stepped shape can form the individual supply chamber 8 in a desired shape, and the bubble can be more reliably purged.

The stepped shape in the present embodiment is described again.

In the present embodiment, a cross section taken in the lamination direction and the direction from the individual supply chamber 8 toward the pressure chamber 6 (i.e., the first direction and the second direction) is defined as a first cross section. The first cross section is, for example, the cross section illustrated in FIG. 7A. In the present embodiment, a cross section taken in the lamination direction and the direction orthogonal to the direction from the individual supply chamber 8 toward the pressure chamber 6 (i.e., the first direction and the third direction) is defined as a second cross section. The second cross section is, for example, the cross section illustrated in FIG. 7B. The individual supply chamber 8 according to the present embodiment has step-shaped wall faces formed by the openings of the multiple channel plates in the first cross section and the second cross section.

Furthermore, in the present embodiment, the individual supply chamber 8 preferably has a region Em in which no other component is present between the diaphragm 3 and the nozzle plate 1. The region Em may be referred to as a void space. In other words, the individual supply chamber 8 has the upper face and the lower face formed by the diaphragm 3 and the nozzle plate 1, respectively, and has the region Em in which no other component is present between the diaphragm 3 and the nozzle plate 1. The region Em can further decrease the inertance and shorten the natural vibration period Tc.

The pressure chamber 6 according to Embodiment 2 is described below. In the present embodiment, the pressure chamber 6 preferably has the stepped shape, similarly to the individual supply chamber 8, as in Embodiment 2.

Figure 7D:
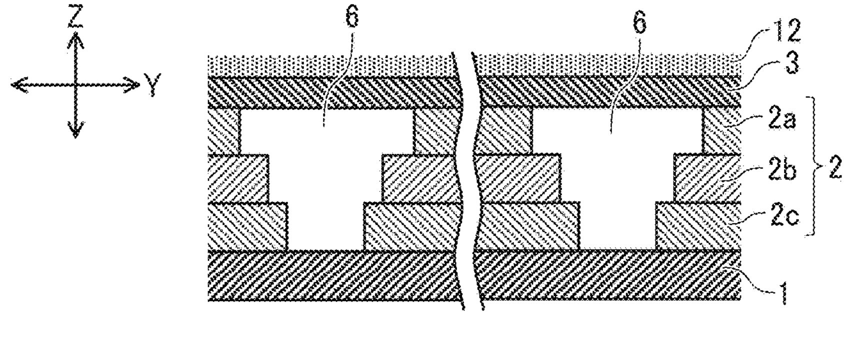

FIG. 7D is a schematic cross-sectional view of the liquid discharge head of FIGS. 7A and 7C taken along line G-G in FIGS. 7A and 7C, i.e., a cross-sectional view in the nozzle array direction (Y direction). In FIG. 7D, only two adjacent pressure chambers 6 are illustrated.

In the present embodiment, the size of the opening forming the pressure chamber 6 is preferably smaller as the channel plate is closer to the nozzle plate 1 when the multiple channel plates are compared with one another. Due to such a configuration, when a bubble is mixed in the liquid, the bubble can be smoothly purged.

The present embodiment corresponds to this configuration.

As illustrated in FIGS. 7A, 7C, and 8, the size of the openings 16*a*, 16*b*, and 16*c* forming the pressure chamber 6 is smaller as the channel plate is closer to the nozzle plate 1 when the first channel plate 2*a*, the second channel plate 2*b*, and the third channel plate 2*c* are compared with one another. In other words, the size of the opening 16*a*, the opening 16*b*, and the opening 16*c* decreases in this order. The size of the opening used herein refers to an area of the opening in plan view. In FIG. 8, the opening 16*a*, the opening 16*b*, and the opening 16*c* have an area s4, an area s5, and an area s6, respectively. The areas s4, s5, and s6 satisfy s4>s5>s6. The area s4 is the area of the opening 16*a* up to a broken line indicating the boundary between the opening 16*a* and the opening of the fluid restrictor 7.

Furthermore, in the present embodiment, the opening forming the pressure chamber 6 has a longitudinal side and a transverse side in the in-plane direction of the channel substrate 2, and the longitudinal side and the transverse side of the opening are preferably shorter as the channel plate is closer to the nozzle plate 1 when the multiple channel plates are compared with one another. Due to such a configuration, when a bubble is mixed in the liquid, the bubble can be more smoothly purged. The present embodiment corresponds to this configuration.

As illustrated in FIG. 8, each of the opening 16*a*, the opening 16*b*, and the opening 16*c* forming the pressure chamber 6 has a longitudinal side and a transverse side in the in-plane direction of the channel substrate 2. The direction of the longitudinal side is the X direction (i.e., the second direction), and the direction of the transverse side is the Y direction (i.e., the third direction). In the first channel plate 2*a*, the opening 16*a* is connected to the opening of the fluid restrictor 7, and the opening 16*a* having such a shape also has the longitudinal side and the transverse side.

As illustrated in FIG. 8, the longitudinal sides of the opening 16*a*, the opening 16*b*, and the opening 16*c* have a length c4, a length c5, and a length c6, respectively, and the transverse sides of the opening 16*a*, the opening 16*b*, and the opening 16*c* have a length d4, a length d5, and a length d6, respectively. The lengths c4, c5, and c6 satisfy c4>c5>c6, and the lengths d4, d5, and d6 satisfy d4>d5>d6.

Furthermore, in the present embodiment, a wall face of the pressure chamber 6 preferably has a stepped shape. As illustrated in FIGS. 7A and 7D, the stepped shape is preferably a shape in which a distance between opposing wall faces becomes shorter as the channel plate is closer to the nozzle plate 1. In this case, when a bubble is mixed in the liquid, the bubble can be reliably purged. The present embodiment corresponds to this configuration.

When the pressure chamber 6 is defined by the configuration in which the openings in the multiple channel plates become smaller as the channel plate is closer to the nozzle plate 1, the pressure chamber 6 may have a configuration in which positions of the openings are shifted from one another. The definition by the stepped shape can form the pressure chamber 6 in a desired shape, and the bubble can be more reliably purged.

The stepped shape in the present embodiment is described again.

In the present embodiment, a cross section taken in the lamination direction and the direction from the individual supply chamber 8 toward the pressure chamber 6 is defined as a first cross section. The first cross section is, for example, the cross section illustrated in FIG. 7A. In the present embodiment, a cross section taken in the lamination direction and the direction orthogonal to the direction from the individual supply chamber 8 toward the pressure chamber 6 is defined as a second cross section. The second cross section is, for example, the cross section illustrated in FIG. 7D. The pressure chamber 6 according to the present embodiment has step-shaped wall faces formed by the openings of the multiple channel plates in the first cross section and the second cross section.

Both the individual supply chamber 8 and the pressure chamber 6 preferably have the above-described stepped shape. In this case, bubble purge performance is further enhanced.

A size relation between the openings not overlapping with each other is not limited to a particular relation. For example, the area s6 may be larger than the area s1, or the area s4 may be smaller than the area s3.

Other channel substrates 2 according to embodiments of the present disclosure are described below.

FIGS. 9A to 9D are schematic cross-sectional views of a part of a liquid discharge head, illustrating other channel substrates 2, similar to FIGS. 5A and 5B. FIGS. 9A to 9D correspond to Embodiments 3 to 6, respectively.

Figure 9A:
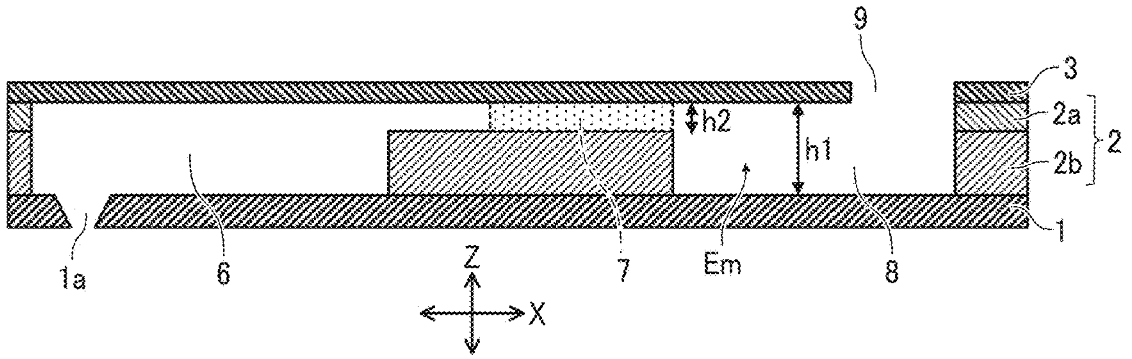
FIGS. 9A to 9D are schematic cross-sectional views of liquid discharge heads according to Embodiments 3 to 6 of the present disclosure.
Figure 9B:
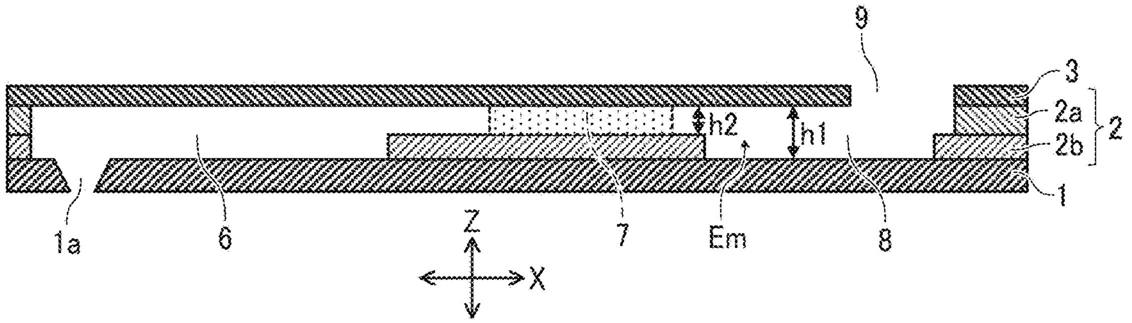
Figure 9C:
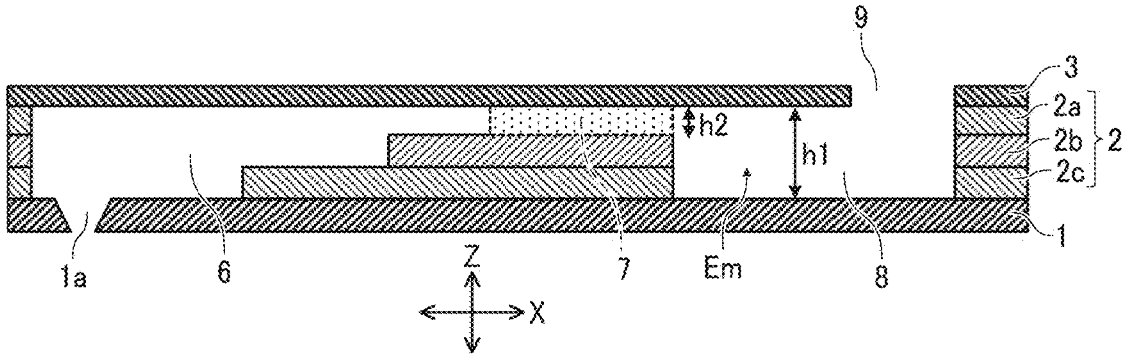

In the present embodiment, as illustrated in Embodiment 3 (FIG. 9A), the thicknesses of the multiple channel plates forming the channel substrate 2 may be appropriately changed. For example, as illustrated in FIG. 9A, the thickness of the second channel plate 2*b* may be increased. By appropriately changing the thicknesses of the first channel plate 2*a* and the second channel plate 2*b*, the height ratio h2/h1 can be adjusted. The thickness direction herein is the height direction of the individual supply chamber 8, i.e., the Z direction in FIG. 9A.

In Embodiment 4 (FIG. 9B), the individual supply chamber 8 is formed by the openings of the first channel plate 2*a* and the second channel plate 2*b*, and the size of the opening forming the individual supply chamber 8 is smaller as the channel plate is closer to the nozzle plate 1. In Embodiment 2 described above, the first channel plate 2*a*, the second channel plate 2*b*, and the third channel plate 2*c* are used, but in Embodiment 4, the first channel plate 2*a* and the second channel plate 2*b* are used. Referring also to FIG. 8, in Embodiment 4, the opening 18*b* of the second channel plate 2*b* is smaller than the opening 18*a* of the first channel plate 2*a* (i.e., s1>s2).

In Embodiment 4, as in Embodiment 2, the wall face of the individual supply chamber 8 has the stepped shape, and the distance between the opposing wall faces becomes shorter as the nozzle plate is closer to the nozzle plate 1.

In the present embodiment, as in Embodiment 2 (e.g., FIGS. 7A to 7D) and Embodiment 5 (FIG. 9C), the channel substrate 2 may include three components: the first channel plate 2*a*, the second channel plate 2*b*, and the third channel plate 2*c*. The channel substrate 2 may include four or more components.

Figure 9D:
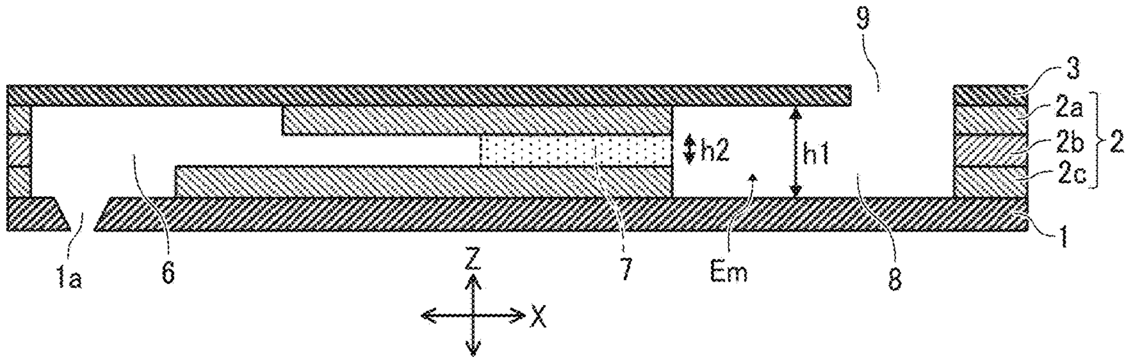

In the present embodiment, the position of the fluid restrictor 7 may be changed as in Embodiment 6 (FIG. 9D). As in other embodiments, the component having the fluid restrictor 7 may be disposed at the top of the channel substrate 2, or as in Embodiment 6, the component including the fluid restrictor 7 may not be disposed at the top of the channel substrate 2.

Figure 10:
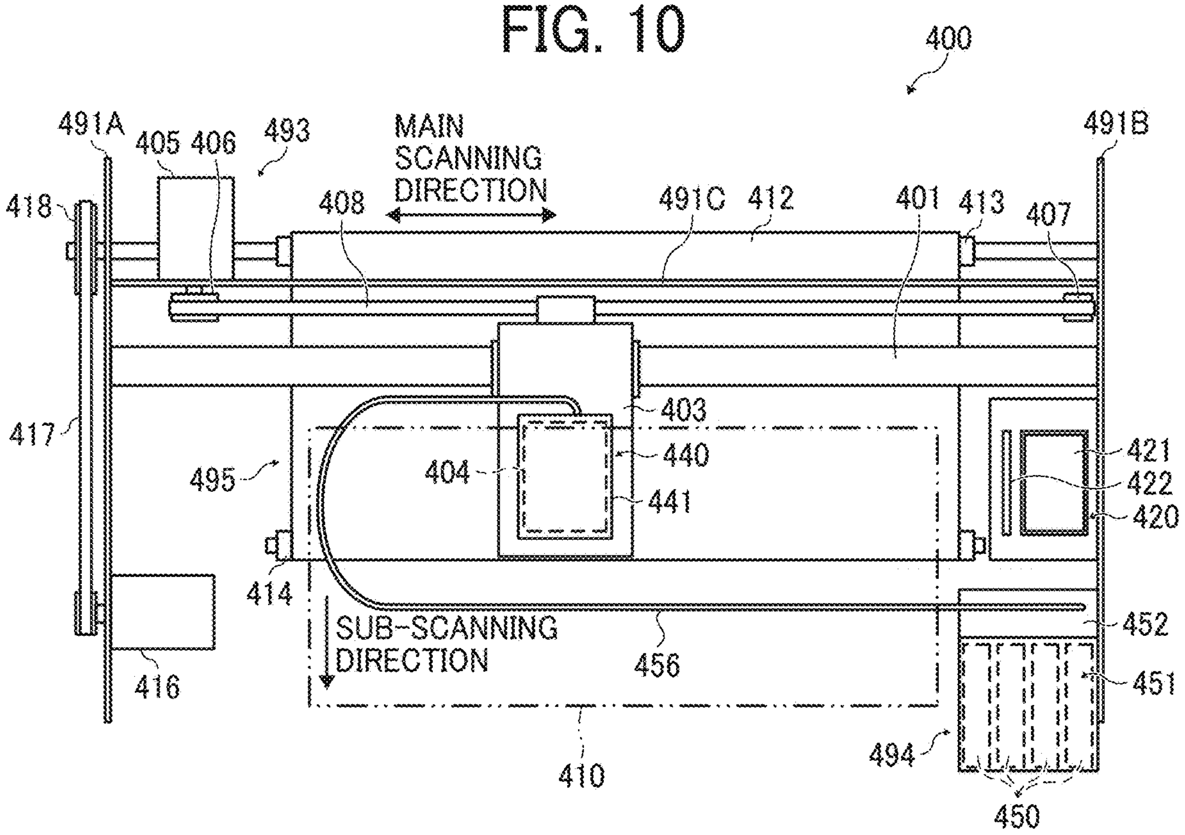
FIG. 10 is a schematic plan view of a liquid discharge apparatus according to an embodiment of the present disclosure.
Figure 11:
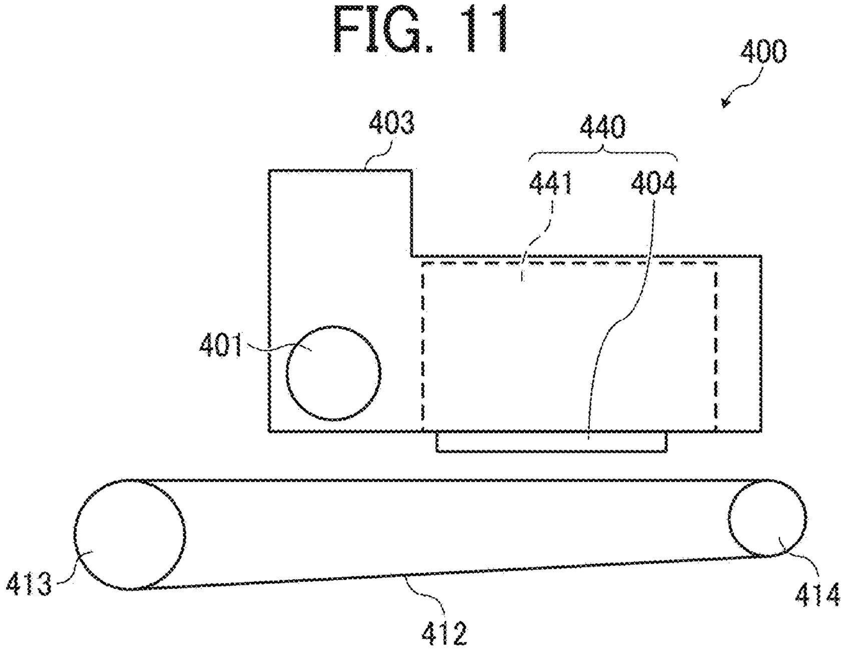
FIG. 11 is a schematic side view of the liquid discharge apparatus of FIG. 10.

A liquid discharge apparatus 400 according to an embodiment of the present disclosure is described below with reference to FIGS. 10 and 11. FIG. 10 is a plan view of a part of the liquid discharge apparatus 400. FIG. 11 is a side view of the part of the liquid discharge apparatus 400 in FIG. 10.

The liquid discharge apparatus 400 is a serial type apparatus. A main-scanning moving mechanism 493 moves a carriage 403 reciprocally in a main scanning direction. The main-scanning moving mechanism 493 includes a guide 401, a main scanning motor 405, and a timing belt 408. The guide 401 is bridged between a left-side plate 491A and a right-side plate 491B to movably hold the carriage 403. The main scanning motor 405 moves the carriage 403 reciprocally in the main scanning direction via the timing belt 408 bridged between a drive pulley 406 and a driven pulley 407.

The carriage 403 includes a liquid discharge unit 440 in which a liquid discharge head 404 (e.g., the liquid discharge head described above) and a head tank 441 are integrated into a single unit. The liquid discharge unit 440 may include multiple liquid discharge heads including the liquid discharge head described above. The liquid discharge head 404 of the liquid discharge unit 440 discharges color liquids of, for example, yellow (Y), cyan (C), magenta (M), and black (K). The liquid discharge head 404 is mounted on the liquid discharge unit 440 of the carriage 403 such that a row of the multiple nozzles 4 is arrayed in the sub-scanning direction orthogonal to the main scanning direction. The liquid discharge head 404 discharges the color liquid downward. As the liquid discharge head 404, for example, each of the liquid discharge heads described above can be used.

The liquid stored in liquid cartridges 450 is supplied to the head tank 441 by a supply mechanism 494 for supplying the liquid stored outside the liquid discharge head 404 to the liquid discharge head 404.

The supply mechanism 494 includes a cartridge holder 451 which is a filling part to mount the liquid cartridges 450, a tube 456, and a liquid feed unit 452 including a liquid feed pump. The liquid cartridges 450 are detachably mounted on the cartridge holder 451. The liquid feed unit 452 feeds the liquid from the liquid cartridge 450 to the head tank 441 via the tube 456.

The liquid discharge apparatus 400 includes a conveyance mechanism 495 to convey a sheet 410 as a recording medium. The conveyance mechanism 495 includes a conveyance belt 412 as a conveyor and a sub-scanning motor 416 to drive the conveyance belt 412.

The conveyance belt 412 attracts the sheet 410 to convey the sheet 410 to a position facing the liquid discharge head 404. The conveyance belt 412 is an endless belt stretched between a conveyance roller 413 and a tension roller 414. The attraction can be performed by, for example, electrostatic attraction or air suction.

The conveyance roller 413 is rotationally driven by the sub-scanning motor 416 via a timing belt 417 and a timing pulley 418 to move the conveyance belt 412 circumferentially in the sub-scanning direction.

On one end of the range of movement of the carriage 403 in the main scanning direction, a maintenance mechanism 420 that maintains and recovers the liquid discharge head 404 is disposed lateral to the conveyance belt 412.

The maintenance mechanism 420 includes, for example, a cap 421 to cap the nozzle face (i.e., the surface on which the nozzles 4 are formed) of the liquid discharge head 404 and a wiper 422 to wipe the nozzle face.

The main-scanning moving mechanism 493, the supply mechanism 494, the maintenance mechanism 420, and the conveyance mechanism 495 are mounted onto a housing including the side plates 491A and 491B and a back plate 491C.

In the liquid discharge apparatus 400 having the above-described configuration, the sheet 410 is fed and attracted onto the conveyance belt 412 and conveyed in the sub-scanning direction as the conveyance belt 412 circumferentially moves.

The liquid discharge head 404 is driven in response to an image signal while the carriage 403 moves in the main scanning direction to discharge liquid onto the sheet 410 not in motion. As a result, an image is formed on the sheet 410.

As described above, the liquid discharge apparatus 400 includes the liquid discharge head 404 according to the above-described embodiments of the present disclosure, thus allowing the stable formation of high-quality images.

Figure 12:
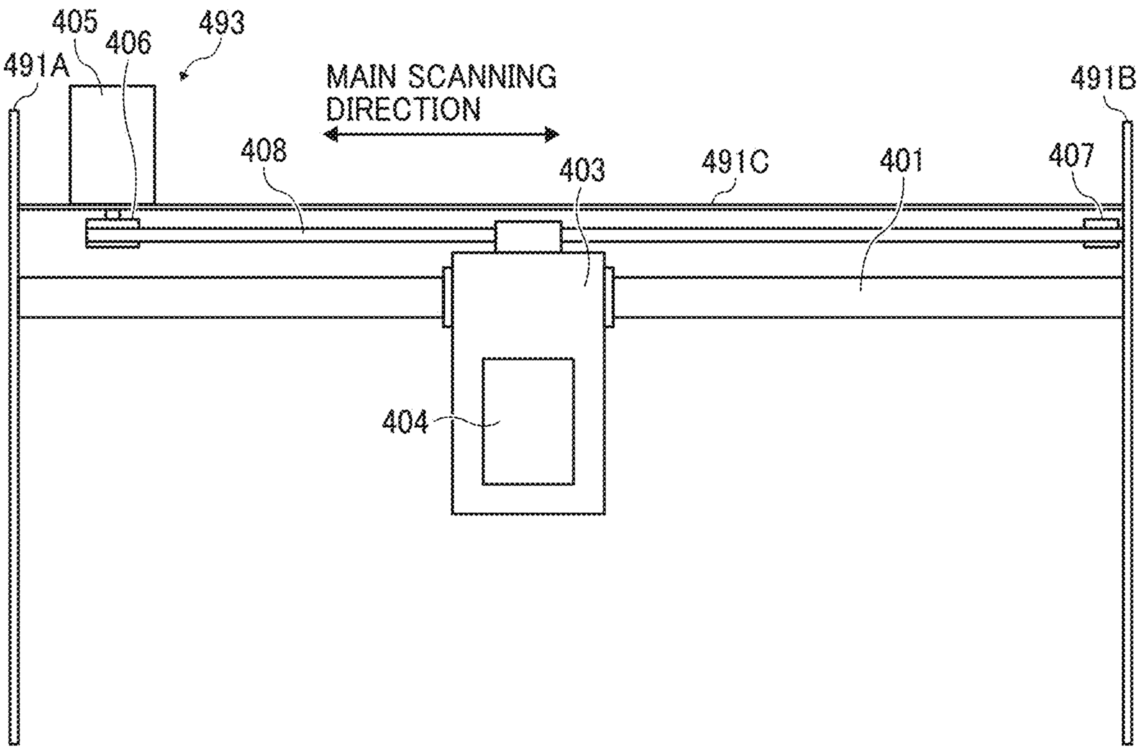
FIG. 12 is a schematic plan view of a liquid discharge unit according to an embodiment of the present disclosure.

Another liquid discharge unit according to an embodiment of the present disclosure is described below with reference to FIG. 12. FIG. 12 is a plan view of a part of the liquid discharge unit according to the present embodiment.

The liquid discharge unit includes the housing, the main-scanning moving mechanism 493, the carriage 403, and the liquid discharge head 404 among the components of the liquid discharge apparatus 400 described above. The side plates 491A and 491B, and the back plate 491C construct the housing.

The liquid discharge unit may further include at least one of the maintenance mechanism 420 described above or the supply mechanism 494 on, for example, the right-side plate 491B of the liquid discharge unit.

Figure 13:
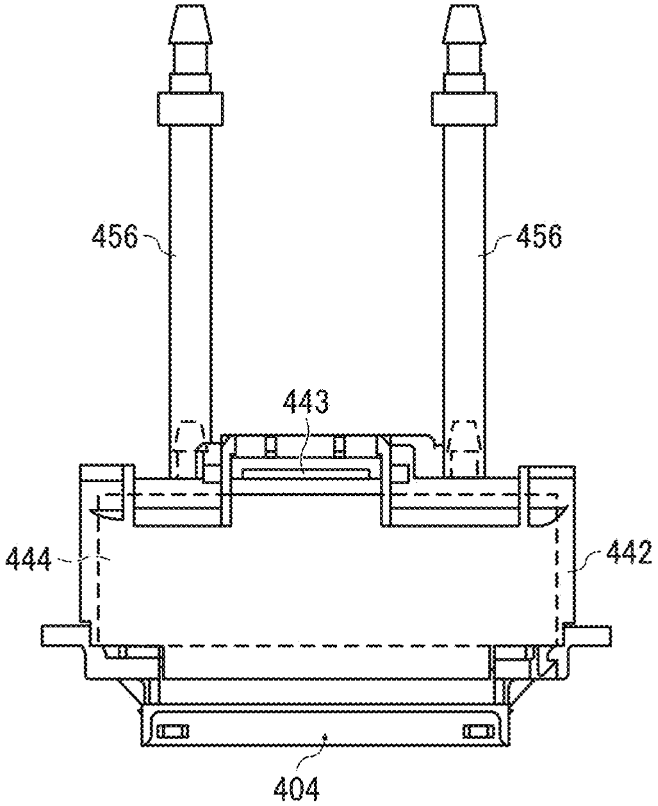
FIG. 13 is a schematic view of another liquid discharge unit according to an embodiment of the present disclosure.

Still another liquid discharge unit according to an embodiment of the present disclosure is described below with reference to FIG. 13. FIG. 13 is a front view of the liquid discharge unit according to the present embodiment.

The liquid discharge unit includes the liquid discharge head 404 on which a channel component 444 is mounted and a tube 456 coupled to the channel component 444.

The channel component 444 is arranged inside a cover 442. Alternatively, the liquid discharge unit 440 may include the head tank 441 instead of the channel component 444. A connector 443 for electrically connecting to the liquid discharge head 404 is disposed on an upper portion of the channel component 444.

In the above-described embodiments of the present disclosure, the liquid discharge apparatus includes the liquid discharge head or the liquid discharge unit, and drives the liquid discharge head to discharge liquid. The liquid discharge apparatus may be, for example, any apparatus that can discharge liquid to a medium to which liquid can adhere or any apparatus to discharge liquid into gas or liquid.

The "liquid discharge apparatus" may further include devices relating to feeding, conveying, and ejecting of the medium onto which liquid can adhere and also include a pretreatment device and an aftertreatment device.

The "liquid discharge apparatus" may be, for example, an image forming apparatus to form an image on a sheet by discharging ink, or a three-dimensional fabrication apparatus to discharge fabrication liquid to a powder layer in which powder material is formed in layers, so as to form a three-dimensional object.

The "liquid discharge apparatus" is not limited to an apparatus that discharges liquid to visualize meaningful images such as letters or figures. For example, the liquid discharge apparatus may be an apparatus that forms patterns having no meaning or an apparatus that fabricates three-dimensional images.

The above-described term "medium onto which liquid can adhere" represents a medium on which liquid is at least temporarily adhered, a medium on which liquid is adhered and fixed, or a medium into which liquid adheres and permeates. Specific examples of the "medium onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "medium onto which liquid can adhere" includes any medium to which liquid adheres, unless otherwise specified.

Examples of materials of the "medium onto which liquid can adhere" include any materials to which liquid can adhere even temporarily, such as paper, thread, fiber, fabric, leather, metal, plastic, glass, wood, ceramic, construction materials (e.g., wallpaper or floor material), and cloth textile.

Examples of the "liquid" include ink, treatment liquid, deoxyribonucleic acid (DNA) sample, resist, pattern material, binder, fabrication liquid, and solution or liquid dispersion containing amino acid, protein, or calcium.

The liquid discharge apparatus may be an apparatus to move the liquid discharge head and the medium onto which liquid can adhere relative to each other. However, the liquid discharge apparatus is not limited to such an apparatus. For example, the liquid discharge apparatus may be a serial head apparatus that moves the liquid discharge head or a line head apparatus that does not move the liquid discharge head.

Examples of the liquid discharge apparatus further include: a treatment liquid applying apparatus that discharges a treatment liquid onto a sheet to apply the treatment liquid to the surface of the sheet, for reforming the surface of the sheet; and an injection granulation apparatus that injects a composition liquid, in which a raw material is dispersed in a solution, through a nozzle to granulate fine particle of the raw material.

The "liquid discharge unit" refers to a liquid discharge head integrated with functional components or mechanisms, i.e., an assembly of components related to liquid discharge. For example, the "liquid discharge unit" includes a combination of the liquid discharge head with at least one of the head tank, the carriage, the supply mechanism, the maintenance recovery mechanism, or the main scanning moving mechanism.

The above integration may be achieved by, for example, a combination in which the liquid discharge head and a functional part(s) are secured to each other through, e.g., fastening, bonding, or engaging, and a combination in which one of the liquid discharge head and the functional part(s) is movably held to the other. The liquid discharge head and the functional part(s) or unit(s) may be detachably attached to each other.

Examples of the liquid discharge unit include the liquid discharge unit 440 in which a liquid discharge head and a head tank are integrated to form a single unit, as illustrated in FIG. 11. Alternatively, the liquid discharge head and the head tank coupled (connected) to each other via, for example, a tube may form the liquid discharge unit as a single unit. A unit including a filter may further be added to a portion between the head tank and the liquid discharge head of the liquid discharge unit.

In another example, the liquid discharge unit may be an integrated unit in which a liquid discharge head is integrated with a carriage.

As yet another example, the liquid discharge unit is a unit in which the liquid discharge head and the main-scanning moving mechanism are combined into a single unit.

The liquid discharge head is movably held by a guide that is a part of the main-scanning moving mechanism. Like the liquid discharge unit 440 illustrated in FIG. 12, the liquid discharge head, the carriage, and the main-scanning moving mechanism may form the liquid discharge unit as a single unit.

In still another example, the cap that forms a part of the maintenance mechanism is secured to the carriage mounting the liquid discharge head so that the liquid discharge head, the carriage, and the maintenance mechanism are integrated as a single unit to form the liquid discharge unit.

Further, the liquid discharge unit includes tubes connected to the liquid discharge head to which the head tank or the channel component is attached so that the liquid discharge head and the supply mechanism are integrated as a single unit, as illustrated in FIG. 13.

The main-scanning moving mechanism may be a guide only. The supply mechanism may be a tube(s) only or a loading device only.

The pressure generator used in the liquid discharge head is not limited to a particular type of pressure generator. The pressure generator is not limited to the piezoelectric actuator (or a laminated-type piezoelectric element) described in the above-described embodiments, and may be, for example, a thermal actuator that employs a thermoelectric transducer element, such as a thermal resistor, or an electrostatic actuator including a diaphragm and opposed electrodes.

In the present specification, the terms "image formation," "recording," "printing," "image printing," and "fabricating" used herein may be used synonymously with each other.

Aspects of the present disclosure are, for example, as follows.

Aspect 1

A liquid discharge head includes a nozzle plate having a nozzle to discharge a liquid and a channel substrate. The channel substrate includes a pressure chamber, a fluid restrictor, and an individual supply chamber. The channel substrate is laminated over the nozzle plate. The pressure chamber communicates with the nozzle. The individual supply chamber communicates with the pressure chamber via the fluid restrictor. The fluid restrictor is a portion of a channel of liquid formed between the pressure chamber and the individual supply chamber. The portion of the channel has a narrow width in an in-plane direction of the channel substrate. A lamination direction of the nozzle plate and the channel substrate is a height direction. A height h1 of the individual supply chamber and a height h2 of the fluid restrictor satisfying $0.3 \leq h2/h1 \leq 0.6$.

In other words, a liquid discharge head includes a nozzle plate and a channel substrate. The nozzle plate has a nozzle from which a liquid is dischargeable in a first direction. The channel substrate is laminated over the nozzle plate in the first direction.

The channel substrate has a pressure chamber communicating with the nozzle, an individual supply chamber having a first height h1 in the first direction, and a fluid restrictor between the pressure chamber and the individual supply chamber. The liquid flows from the individual supply chamber to the pressure chamber through the fluid restrictor in a second direction orthogonal to the first direction. The fluid restrictor has a width narrower than each of a width of the pressure chamber and a width of the individual supply chamber in a third direction orthogonal to the first direction and the second direction, and a second height h2 smaller than the first height h1 in the first direction. The first height h1 of the individual supply chamber and the second height h2 of the fluid restrictor satisfy $0.3 \leq h2/h1 \leq 0.6$.

Aspect 2

In the liquid discharge head according to Aspect 1, the first height h1 of the individual supply chamber is 50 m or more and 200 μm or less.

Aspect 3

In the liquid discharge head according to Aspect 1 or 2, a volume of the individual supply chamber is 6 nL or more and 20 nL or less.

Aspect 4

In the liquid discharge head according to Aspect 1, the channel substrate is formed by laminating multiple channel plates. Each of the multiple channel plates includes one or more openings. The multiple channel plates are laminated, and the pressure chamber and the individual supply chamber are formed by the openings. The fluid restrictor is formed in one of the multiple channel plates.

In other words, the channel substrate includes multiple channel plates laminated one on another in the first direction. Each of the multiple channel plates has a first opening defining the pressure chamber and a second opening defining the individual supply chamber. One of the multiple channel plates has the fluid restrictor defining a channel connecting the first opening and the second opening.

Aspect 5

In the liquid discharge head according to Aspect 4, a size of the opening forming the individual supply chamber is smaller as a channel plate is closer to the nozzle plate when the multiple channel plates are compared with each other.

In other words, one of the multiple channel plates has the second opening smaller than the second opening of another of the multiple channel plates farther from the nozzle plate than the one of the multiple channel plates in the first direction.

Aspect 6

In the liquid discharge head according to Aspect 5, the opening forming the individual supply chamber includes a longitudinal side and a transverse side in the in-plane direction of the channel substrate. The longitudinal side and the transverse side of the opening are shorter as the channel plate is closer to the nozzle plate when the multiple channel plates are compared with one another.

In other words, the second opening of the one of the multiple channel plates has a shorter longitudinal side in the second direction and a shorter transverse side in the third direction than a longitudinal side and a transverse side of the second opening of said another of the multiple channel plates, respectively.

Aspect 7

In the liquid discharge head according to Aspect 5 or 6, a cross section in the lamination direction and a direction from the individual supply chamber toward the pressure chamber is defined as a first cross section, and a cross section in the lamination direction and a direction orthogonal to the direction from the individual supply chamber toward the pressure chamber is defined as a second cross section. In the individual supply chamber, a wall face formed by the openings of the multiple channel plates has a stepped shape in the first cross section and the second cross section.

In other words, the second opening of each of the multiple channel plates forms steps in each of a cross section orthogonal to an axis along the second direction and a cross section orthogonal to another axis along the third direction.

Aspect 8

In the liquid discharge head according to any one of Aspects 4 to 7, a size of the opening forming the pressure chamber is smaller as a channel plate is closer to the nozzle plate when the multiple channel plates are compared with each other.

In other words, one of the multiple channel plates has the first opening smaller than the first opening of another of the multiple channel plates farther from the nozzle plate than the one of the multiple channel plates in the first direction.

Aspect 9

In the liquid discharge head according to Aspect 8, the opening forming the pressure chamber includes a longitudinal side and a transverse side in an in-plane direction of the channel substrate. The longitudinal side and the transverse side of the opening are shorter as a channel plate is closer to the nozzle plate when the multiple channel plates are compared with each other.

In other words, the first opening of the one of the multiple channel plates has a shorter longitudinal side in the second direction and a shorter transverse side in the third direction than a longitudinal side and a transverse side of the first opening of said another of the multiple channel plates, respectively.

Aspect 10

In the liquid discharge head according to Aspect 8 or 9, a cross section in the lamination direction and a direction from the individual supply chamber toward the pressure chamber is defined as a first cross section, and a cross section in the lamination direction and a direction orthogonal to the direction from the individual supply chamber toward the pressure chamber is defined as a second cross section. In the pressure chamber, a wall face formed by the openings of the multiple channel plates has a stepped shape in the first cross section and the second cross section.

In other words, the first opening of each of the multiple channel plates forms steps in each of a cross section orthogonal to an axis along the second direction and a cross section orthogonal to another axis along the third direction.

Aspect 11

The liquid discharge head according to any one of Aspects 1 to 10 further includes a diaphragm laminated over the channel substrate on a side opposite to the nozzle plate. The individual supply chamber includes an upper face and a lower face formed of the diaphragm and the nozzle plate, respectively, and includes a region in which no other component is provided between the diaphragm and the nozzle plate.

In other words, the liquid discharge head according to any one of Aspects 1 to 10 further includes a diaphragm laminated over a first face of the channel substrate opposite to a second face of the channel substrate laminated over the nozzle plate. The diaphragm and the nozzle plate define an upper face and a lower face of the individual supply chamber, respectively, to form a void space between the diaphragm and the nozzle plate.

Aspect 12

The liquid discharge head according to any one of Aspects 1 to 11 is a non-circulation type that does not circulate the liquid.

In other words, the liquid discharge head is a non-circulation type liquid discharge head that does not circulate the liquid.

Aspect 13

A liquid discharge unit includes the liquid discharge head according to any one of Aspects 1 to 12.

In other words, a liquid discharge unit includes multiple liquid discharge heads including the liquid discharge head according to any one of Aspects 1 to 12.

Aspect 14

In the liquid discharge unit according to Aspect 13, at least any one of a head tank that stores a liquid to be supplied to the liquid discharge head; a carriage that mounts the liquid discharge head; a supply mechanism that supplies the liquid to the liquid discharge head; a maintenance mechanism that maintains and recovers the liquid discharge head; or a main scanning moving mechanism that moves the liquid discharge head in a main scanning direction is integrated with the liquid discharge head.

In other words, a liquid discharge unit includes the liquid discharge head according to any one of Aspects 1 to 12 and at least one of a head tank to store the liquid to be supplied to the liquid discharge head, a carriage to mount the liquid discharge head, a supply mechanism to supply the liquid to the liquid discharge head, a maintenance mechanism to maintain and recover the liquid discharge head, or a main-scanning moving mechanism to move the liquid discharge head in a main scanning direction, to form a single unit with the liquid discharge head.

Aspect 15

A liquid discharge apparatus includes the liquid discharge head according to any one of Aspects 1 to 12, or the liquid discharge unit according to Aspect 13 or 14.

In other words, a liquid discharge apparatus includes the liquid discharge head according to any one of Aspects 1 to 12, to discharge the liquid to a medium and a conveyor to convey the medium to a position facing the liquid discharge head, or a liquid discharge apparatus includes the liquid discharge unit according to Aspect 13 or 14, to discharge the liquid to a medium and a conveyor to convey the medium to a position facing the liquid discharge unit.

As described above, according to one aspect of the present disclosure, a liquid discharge head can be provided that shortens the natural vibration period Tc and increases the printing speed.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:

a nozzle plate including a nozzle from which a liquid is dischargeable in a first direction; and a channel substrate laminated over the nozzle plate in the first direction, the channel substrate including:

a pressure chamber communicating with the nozzle;

an individual supply chamber having a first height h1 in the first direction; and a fluid restrictor, between the pressure chamber and the individual supply chamber, through which the liquid flows from the individual supply chamber to the pressure chamber in a second direction orthogonal to the first direction, the fluid restrictor including:

a width narrower than each of a width of the pressure chamber and a width of the individual supply chamber in a third direction orthogonal to the first direction and the second direction; and a second height h2 smaller than the first height h1 in the first direction, and the first height h1 of the individual supply chamber and the second height h2 of the fluid restrictor satisfying $0.3 \leq h2/h1 \leq 0.6$, wherein the individual supply chamber has a volume of 6 nL or more and 20 nL or less.

2. The liquid discharge head according to claim 1, wherein the first height h1 of the individual supply chamber is 50 μm or more and 200 μm or less.

3. The liquid discharge head according to claim 1, wherein;

the channel substrate includes multiple channel plates laminated one on another in the first direction, each of the multiple channel plates includes:

a first opening defining the pressure chamber; and a second opening defining the individual supply chamber, and one of the multiple channel plates includes the fluid restrictor defining a channel connecting the first opening and the second opening.

4. The liquid discharge head according to claim 3, wherein;

one of the multiple channel plates has the second opening smaller than the second opening of another of the multiple channel plates farther from the nozzle plate than the one of the multiple channel plates in the first direction.

5. The liquid discharge head according to claim 4, wherein the second opening of the one of the multiple channel plates includes:

a shorter longitudinal side in the second direction than a longitudinal side; and a shorter transverse side in the third direction than a transverse side of the second opening of said another of the multiple channel plates.

6. The liquid discharge head according to claim 4, wherein the second opening of each of the multiple channel plates forms steps in each of:

a cross section orthogonal to an axis along the second direction, a cross section orthogonal to another axis along the third direction.

7. The liquid discharge head according to claim 3, wherein;

one of the multiple channel plates has the first opening smaller than the first opening of another of the multiple channel plates farther from the nozzle plate than the one of the multiple channel plates in the first direction.

8. The liquid discharge head according to claim 7, wherein the first opening of the one of the multiple channel plates includes:

a shorter longitudinal side in the second direction than a longitudinal side; and a shorter transverse side in the third direction than a transverse side of the first opening of said another of the multiple channel plates.

9. The liquid discharge head according to claim 7, wherein the first opening of each of the multiple channel plates forms steps in each of:

a cross section orthogonal to an axis along the second direction, a cross section orthogonal to another axis along the third direction.

10. The liquid discharge head according to claim 1, further comprising:

a diaphragm laminated over a first face of the channel substrate opposite to a second face of the channel substrate laminated over the nozzle plate, wherein the diaphragm and the nozzle plate define an upper face and a lower face of the individual supply chamber, respectively, to form a void space between the diaphragm and the nozzle plate.

11. The liquid discharge head according to claim 1, wherein:

the liquid discharge head is a non-circulation type liquid discharge head that does not circulate the liquid.

12. A liquid discharge unit comprising multiple liquid discharge heads including the liquid discharge head according to claim 1.

13. A liquid discharge apparatus comprising:

the liquid discharge unit according to claim 12, to discharge the liquid to a medium; and a conveyor to convey the medium to a position facing the liquid discharge unit.

14. A liquid discharge apparatus comprising:

the liquid discharge head according to claim 1, to discharge the liquid to a medium; and a conveyor to convey the medium to a position facing the liquid discharge head.

15. The liquid discharge head according to claim 1, wherein:

the fluid restrictor includes a uniform-width region having a constant width in the third direction.

16. The liquid discharge head according to claim 15, wherein:

the channel substrate includes a first channel plate, a second channel plate, and a third channel plate laminated in the first direction.

17. The liquid discharge head according to claim 16, wherein:

a wall face of the individual supply chamber has a stepped shape formed by the first, second, and third channel plates such that a distance between opposing wall faces of the individual supply chamber becomes shorter as the channel substrate is closer to the nozzle plate.

18. The liquid discharge head according to claim 1, wherein:

the nozzle plate includes multiple nozzles arrayed in a row along the third direction, and the channel substrate includes multiple pressure chambers and multiple individual supply chambers corresponding to the multiple nozzles.

19. The liquid discharge head according to claim 1, wherein:

the pressure chamber includes a wall face with a stepped shape in which a distance between opposing wall faces becomes shorter as the channel substrate is closer to the nozzle plate.

20. A liquid discharge unit comprising:

a liquid discharge head including:

a nozzle plate including a nozzle from which a liquid is dischargeable in a first direction; and a channel substrate laminated over the nozzle plate in the first direction, the channel substrate including:
a pressure chamber communicating with the nozzle;
an individual supply chamber having a first height h1 in the first direction; and
a fluid restrictor, between the pressure chamber and the individual supply chamber, through which the liquid flows from the individual supply chamber to the pressure chamber in a second direction orthogonal to the first direction,
the fluid restrictor including:
a width narrower than each of a width of the pressure chamber and a width of the individual supply chamber in a third direction orthogonal to the first direction and the second direction; and
a second height h2 smaller than the first height h1 in the first direction, and
the first height h1 of the individual supply chamber and the second height h2 of the fluid restrictor satisfying $0.3<h2/h1<0.6$; and
at least one of:
a head tank to store the liquid to be supplied to the liquid discharge head;
a carriage to mount the liquid discharge head;
a supplier to supply the liquid to the liquid discharge head;
a maintainer to maintain the liquid discharge head; or
a main-scanning mover to move the liquid discharge head in a main scanning direction,
to form a single unit with the liquid discharge head.

* * * * *